United States Patent [19]
Schlenker

[11] 3,937,880
[45] Feb. 10, 1976

[54] MAGNETIC DISC CODER-DECODER

[75] Inventor: Vesper A. Schlenker, Moorestown, N.J.

[73] Assignee: The United States of America as represented by the Secretary of the Army, Washington, D.C.

[22] Filed: Dec. 5, 1957

[21] Appl. No.: 700,919

[52] U.S. Cl. .................. 178/22; 340/206; 340/350; 340/357
[51] Int. Cl.² ...................... G08C 19/16; H04L 9/00
[58] Field of Search ............. 343/6, 65, 6.8, 2.5, 12, 343/13; 340/189, 203, 206, 348, 350, 357, 58, 364, 365; 178/22

[56] References Cited
UNITED STATES PATENTS

| | | | |
|---|---|---|---|
| 2,326,880 | 8/1943 | Norrman | 343/13 |
| 2,404,696 | 7/1946 | Deal | 343/7.5 |
| 2,648,060 | 8/1953 | Turner, Jr. | 343/6.5 |

*Primary Examiner*—Malcolm F. Hubler
*Attorney, Agent, or Firm*—Nathan Edelberg; Robert P. Gibson; Jeremiah G. Murray

EXEMPLARY CLAIM

1. A magnetic disc coder-decoder comprising a rotatable magnetic disc means, said disc means being adapted to have a code comprising a plurality of tone bursts recorded thereon, means for rotating said disc means, means for taking said tone bursts from said disc means and transmitting said code in the form of pulses of radiant energy, means for receiving transponder reply pulses in the form of coded infrared flashes, means for converting said infrared flashes to tone bursts, means for recording said tone bursts on said disc means, a coincidence detector, means for taking said tone bursts from said disc means and means for applying said tone bursts to said coincidence detector, said coincidence detector providing a single pulse output only upon simultaneous application thereto of a predetermined number tone bursts.

8 Claims, 5 Drawing Figures

TRANSMIT (CODE)

RECEIVE (CODE)

INVENTOR,
VESPER A. SCHLENKER

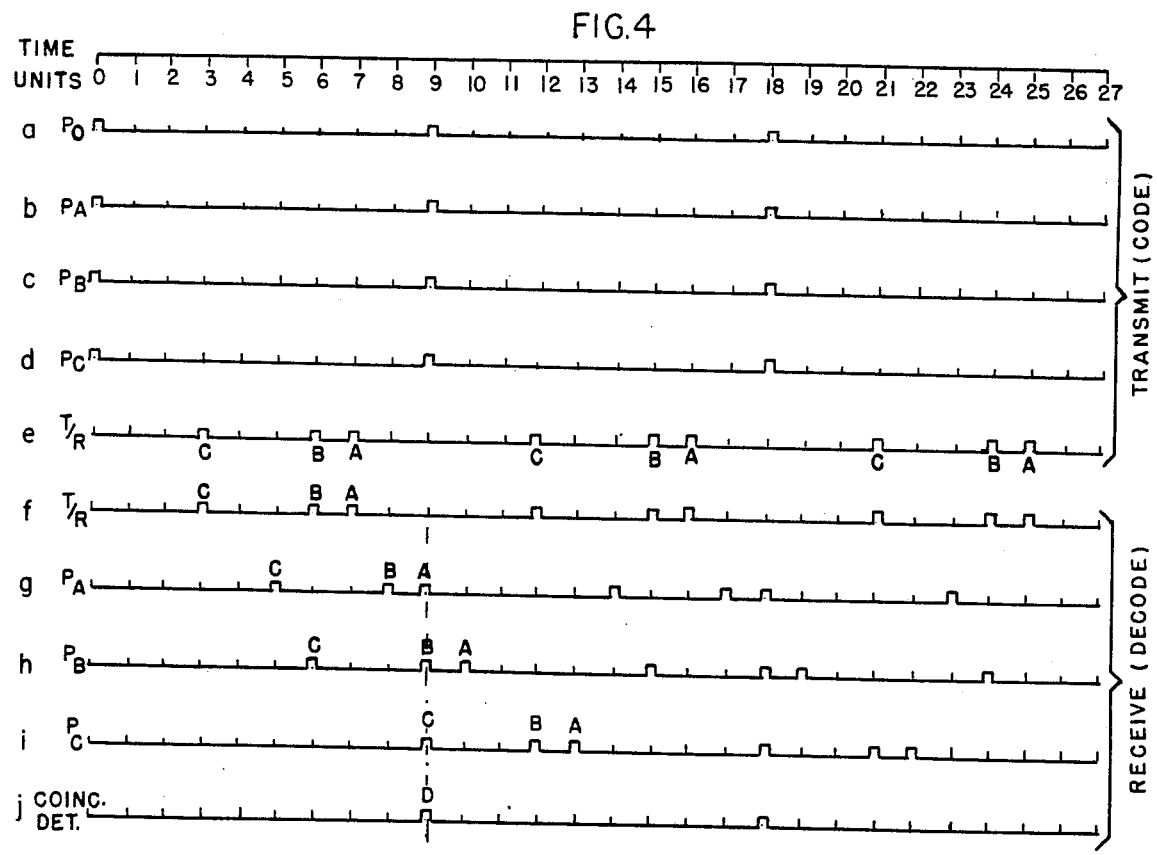
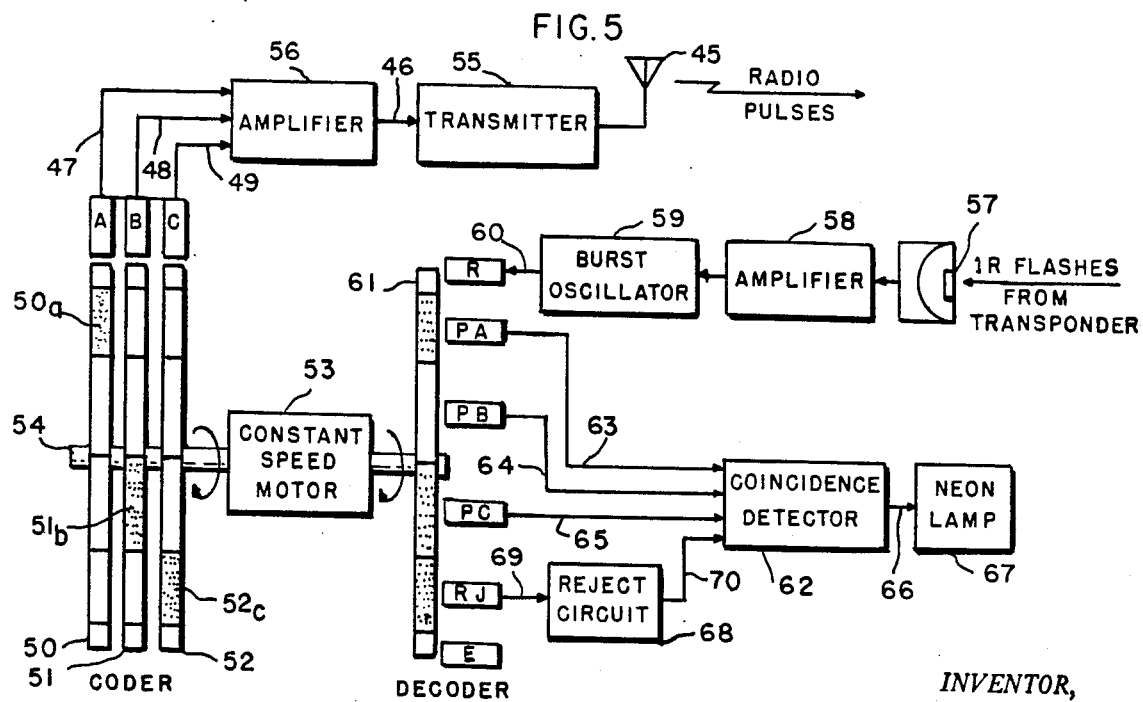

MAGNETIC DISC CODER-DECODER

This invention relates to short range IFF systems and more particularly to a magnetic disc coder-decoder therefor.

A short range IFF system with which the coder-decoder of this invention may be used is disclosed and claimed in the application of Harry Dauber, Ser. No. 727,500, Filed Apr. 9, 1957, and now abandoned, for "Infrared and Visual Interrogator-Responsor".

It is an object of this invention to provide a novel magnetic disc coder and decoder for a short range IFF system which utilizes existing radio facilities for interrogation and infrard for reply.

The features of my invention which I believe to be novel are set forth with particularity in the appended claims. My invention itself, however, both as to its organization and method of operation, together with further objects and advantages thereof, may best be understood by reference to the following description taken in conjunction with the accompanying drawing in which:

FIG. 4 illustrates the time relationship of the pulses during operation of the device; and FIG. 5 illustrates schematically a preferred embodiment of the invention.

Figure 1:
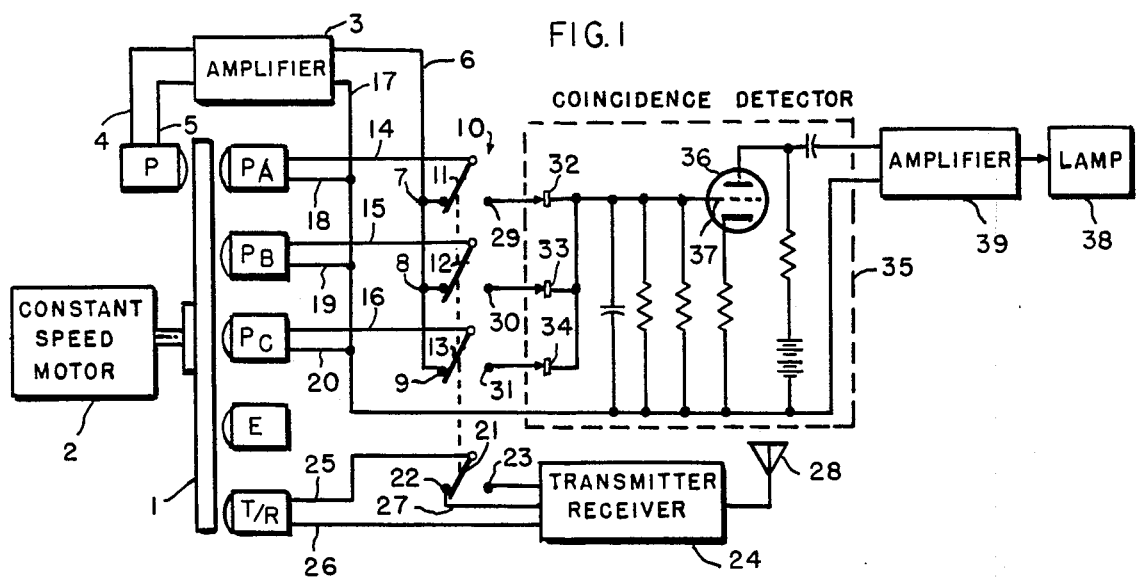
FIG. 1 illustrates a simplified embodiment of the invention.
Figure 2:
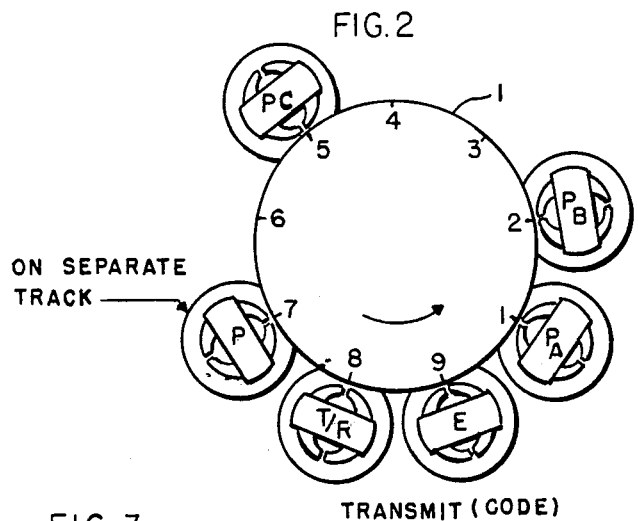
FIG. 2 shows the position of the magnetic heads around the disc during transmission of the coded information.
Figure 3:
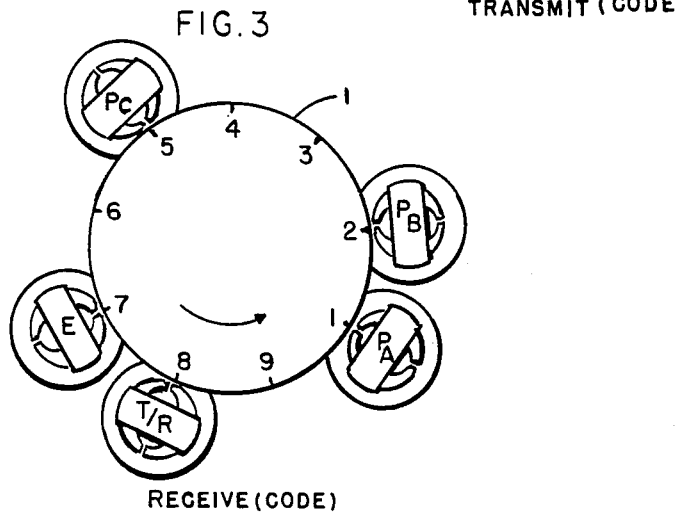
FIG. 3 shows the position of the magnetic heads around the disc during reception of the coded information.

Referring now to the drawings, FIGS. 1, 2 and 3 illustrate schematically a simplified embodiment of the magnetic disc coder-decoder. This embodiment will be utilized to describe the functioning of the invention. The coder-decoder comprises basically a magnetic disc, five magnetic record-reproduce heads and one erase head.

The embodiment of FIG. 1 is designed for transmitting or receiving three electrical pulses or tone bursts prearranged in three of six equal elementary time intervals. Disc 1 is mechanically coupled to any conventional electric or spring powered constant speed motor 2. Conventional magnetic heads $P_A$, $P_B$, $P_C$ and T/R are mounted to record tone bursts on or pick up tone bursts from a first sound track on the magnetic rim of disc 1. The magnetic rim may comprise, for example, brass treated with a nickel-cobalt deposit less than 0.001 inch in thickness. Disc 1 is provided with a second sound track from which a tone burst is picked up by head P. Erase head E may be a permanent magnet and is positioned to erase the first sound track only after the tone bursts have served their respective purposes, as will be explained hereinafter. Head P is connected to amplifier 3 by leads 4 and 5. Amplifier 3 is connected by lead 6 to switch positions 7, 8 and 9 of ganged switch 10. Heads $P_A$, $P_B$ and $P_C$ are connected to switch arms 11, 12 and 13 by means of leads 14, 15 and 16, respectively. Ganged switch 10 comprises a further switch arm 21 and contacts 22 and 23. With the switch arm on contact 22, head T/R is connected to the transmitter portion of transmitter-receiver 24 by leads 25, 26 and 27.

The system so far described represents the transmitting portion whereby the interrogation code is transmitted by antenna 28 to a transponder (not shown) in the area being interrogated. The transponder, upon receiving the proper code group, will radiate a reply code in the form of coded infrared flashes which may, for example, be the same as the code transmitted.

To utilize the device of FIG. 1 as a decoder, ganged switch 10 is moved to its alternate position, namely with switch arms 11, 12, 13 and 21 connected to contacts 29, 30, 31 and 23 respectively. The coded infrared flashes from the transponder will be received by the signal receiver portion of transmitter-receiver 24. The receiver portion may compromise an optical system with an infrared cell at its focus (not shown) whereby the infrared flashes are converted to electrical pulses which are then converted into tone bursts and recorded by head T/R on the first sound track of disc 1, as will be explained in more detail with reference to FIGS. 2, 3, 4 and 5. If the correct code group is received, the outputs of pickup heads $P_A$, $P_B$ and $P_C$ will be applied simultaneously to rectifiers 32, 33 and 34 of coincidence detector 35. Triode amplifer 36 will produce a single pulse output when the simultaneously rectified voltages add to override the negative bias of grid 37 which is set to reject two or less voltage units each corresponding to a single pulse. This can be easily accomplished by a judicious selection of the R-C values in the grid cathode circuit and of the value of the bias voltage on grid 37. The single pulse output of the coincidence detector may either be applied directly to neon lamp 38 or, as shown, may be first amplified in an amplifier 39.

FIGS. 2 and 3 illustrate the positions of the various heads around the disc 1 and FIG. 4 illustrates the time relationships of the pulses during operation of the device. FIG. 2 illustrates the positions of the heads for transmitting the coded interrogation. As shown, heads $P_A$, $P_B$ and $P_C$ are positioned in sectors 1, 2 and 5 of disc 1, head T/R in sector 8 and erase head E in sector 9. Head P is shown in sector 7 and is actually positioned to pick up a tone burst from a separate track, as previously described. The tone burst from P energizes heads $P_A$, $P_B$ and $P_C$ simultaneously so that tone bursts are recorded in sectors 1, 2 and 5 simultaneously, as shown in FIG. 4a, b, c and d.

Since disc 1 is rotating in a counterclockwise direction, the pulses will be transmitted in the order C-B-A, as shown in FIG. 4e. The tone burst recorded in sector 5 by $P_C$ will reach sector 8 and be transmitted 3 time units after being recorded, as indicated by pulse C in FIG. 4e. Similarly, the tone burst recorded in Sector 2 by $P_B$ will be transmitted 3 time units after pulse C and the tone burst recorded in sector 1 by $P_A$ will be transmitted 1 time unit after pulse B, as shown in FIG. 4e. The erase head E in sector 9 erases each tone burst after it has been picked up by head T/R.

In order to utilize the device of FIG. 1 as a receiver, ganged switch 10 is moved to its alternate position and erase head E is moved from sector 9 to sector 7, as shown in FIG. 3. The coded infrared flashes from the transponder are received by antenna 28. It should be understood that antenna 28 of FIG. 1 is intended to illustrate both the receiving and transmitting means. The actual structure of the infrared system is illustrated in FIG. 5 of this application and in copending application Ser. No. 727,500 referred to above. As previously mentioned, the reply code may be the same as the code transmitted and is so shown in FIG. 4f which illustrates the coded pulses applied to head T/R.

Referring now to FIG. 3 in conjunction with FIGS. 4f through j, the pulse C, FIG. 4f, is recorded by head T/R on sector 8 of the magnetic rim of disc 1 at time unit 3. With the disc 1 spinning in a counterclockwise direction, the pulse C will be picked up by head $P_A$ opposite sector 1 two time units later, as shown in FIG. 4g. Similarly, head $P_B$ opposite sector 2 will pick up pulse C one time unit after head $P_A$, as shown in FIG. 4h, and head $P_C$ opposite sector 5 will pick up pulse C three time units after head $P_B$. The pulse will be erased by head E opposite sector 7. In a similar manner pulses B and C are recorded and picked up by the appropriate heads. As is evident from FIG. 4, pulses A, B and C will coincide at time unit 9 and will result in a pulse D, FIG. 4j, being produced by coincidence detector 35, as explained above.

The above description sets forth the basic principles and operation of the novel coder-decoder of this invention.

The preferred embodiment will now be described with reference to FIG. 5. Referring now to FIG. 5, the coder comprises three disks 50, 51, and 52 with magnetic rims on each of which a single tone burst is recorded. Each rim is divided into twelve sectors, the rims being shown schematically in FIG. 5 as a development of the circle. The particular code illustrated in FIG. 5 is A1-B3-C7, the tone bursts being shown at 50a, 51b and 52c. The coder discs are rotated in a counterclockwise direction by a constant speed motor 53 by means of common shaft 54. A three unit pickup head A-B-C takes off the tone bursts in sequence. The tone bursts are applied to amplifier 56 via connections 47, 48 and 49. It should be understood that amplifier 56 may include a switching means to control the interrogation. The three-burst code groups are applied to radio transmitter 55 via connection 46 and radiated by antenna 45. The transmitted coded pulse groups are picked up by a transponder (not shown) which radiates coded infrared flashes in reply. The coded infrared reply flashes are converted by infrared cell 57 to electrical pulses which are then amplified in amplifier 58 and applied to burst oscillator 59 as trigger pulses. Burst oscillator 59 generates a short burst of audio frequency oscillations, i.e., a tone burst, for each trigger pulse, the tone bursts being applied to recording head R via connection 60. Magnetic recording head R records each tone burst on rotating disc 61 of the decoder. Disc 61 is identical to coder discs 50, 51 and 52 and is rotated by motor 53 via common shaft 54 as are the coder discs. Pickup heads $P_A$, $P_B$ and $P_C$ are positioned to receive the particular code group generated by the coder, i.e., the heads are positioned in sectors 1, 3 and 7 of decoder disc 61. If the proper reply code is being received, heads $P_A$, $P_B$ and $P_C$ receive the tone bursts simultaneously. The outputs of heads $P_A$, $P_B$ and $P_C$ are applied to coincidence detector 62 via connections 63, 64 and 65. The coincidence detector produces a single pulse output at 66 only when the three pulses from heads $P_A$, $P_B$ and $P_C$ coincide in time at the three inputs of the coincidence detector. Each pulse from coincidence detector 62 flashes neon lamp indicator 67. The reject circuit 68 is provided for added security. Head RJ is connected to reject circuit 68 by connection 69 and the output of reject circuit 68 is connected to coincidence detector 62 by connection 70. If head RJ picks up a tone burst simultaneously with the other pickup heads the reject circuit will destroy the coincidence because the output of the reject circuit via connection 70 is opposite in sign relative to the three inputs via connections 63, 64 and 65 to the coincidence detector from heads $P_A$, $P_B$ and $P_C$. The result, therefore, is a rejection of an incorrect code group. Thus an erroneous indication as a result, for example, of receiving continuous pulses from an enemy source is excluded. Erase head E is provided to erase each tone burst after it has passed heads $P_A$, $P_B$, $P_C$ and RJ.

Discs 51 and 52 are adjustable with respect to index disc 50 so that any desired code may be set up although the first pulse in each code will occupy the first space of the code group.

The various elements of the coder-decoder are conventional. For example, burst oscillator 59 may be of the type disclosed at page 207, "Handbook of Industrial Electronic Control Circuits" by John Marcus and Vin Zeluff, McGraw-Hill, 1948, or at page 425 of "Transistor Circuits" by R. F. Shea, John Wiley and Sons, 1953. The coincidence detector 62 and reject circuit 68 may be of the type disclosed at pages 401–404, FIG. 13–15 of "Pulse and Digital Circuits" by J. Millman and H. Taub, McGraw-Hill, 1956, the pulses from heads $P_A$, $P_B$ and $P_C$ being applied to the signal input terminals and the pulse from the head RJ, when present, being applied to the inhibitor terminal.

It is evident from the above that this invention provides a novel coder-decoder for a short range IFF system which utilizes existing radio facilities for interrogation and infrared for reply.

While there has been described what is at present considered a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A magnetic disc coder-decoder comprising a rotatable magnetic disc means, said disc means being adapted to have a code comprising a plurality of tone bursts recorded thereon, means for rotating said disc means, means for taking said tone burst from said disc means and transmitting said code in the form of pulses of radiant energy, means for receiving transponder reply pulses in the form of coded infrared flashes, means for converting said infrared flashes to tone bursts, means for recording said tone bursts on said disc means, a coincidence detector, means for taking said tone bursts from said disc means for applying said tone bursts to said coincidence detector, said coincidence detector providing a single pulse output only when simultaneous application thereto of a predetermined number tone bursts.

2. The magnetic disc coder-decoder of claim 1 further comprising an indicator means and means connecting said coincidence detector thereto whereby an indication is provided by said single pulse output.

3. A magnetic disc coder-decoder comprising a rotatable disc having first and second sound tracks adjacent the rim thereof, means for rotating said disc, a first magnetic head positioned adjacent said first sound track, a plurality of second magnetic heads positioned adjacent said second track, said first sound track having a single tone burst recorded thereon, means connecting said first magnetic head to each of said second magnetic heads whereby said single tone burst is simultaneously recorded by each of said second magnetic heads on said second sound track, a third magnetic head positioned adjacent said second sound track and means connecting said third magnetic head to a radio transmitter whereby a series of pulses of radiant energy representing said tone bursts are transmitted.

4. The magnetic disc coder-decoder of claim 3 wherein said connecting means comprises a switch means, one position of said switch means connecting said first magnetic head to each of said second magnetic heads and said third head to said radio transmitter, a signal receiver and a coincidence detector, a second position of said switch means connecting said third magnetic head to said radio receiver and said second magnetic heads to said coincidence detector, said coincidence detector providing a single pulse output only upon simultaneous application thereto of a predetermined number tone bursts.

5. The magnetic disc coder-decoder of claim 4 further comprising an indicator means and means connecting said coincidence detector thereto.

6. A magnetic disc coder-decoder comprising a constant speed motor, a plurality of coder discs affixed to the shaft of said motor and rotating therewith, each of said coder discs having a sound track adjacent the rim thereof, each of said sound tracks having a tone burst recorded thereon at a different sector thereof, a magnetic head adjacent each of said coder discs, means connecting each of said heads to a radio transmitter whereby pulses of radiant energy representing said sound bursts are transmitted, a decoder disc having a sound track adjacent the rim thereof affixed to said motor shaft and rotating therewith, receiver means for receiving coded infrared flashes and converting said flashes to tone bursts, a recording head, means connecting said recording head to said receiver means whereby said tone bursts are recorded on said decoder disc sound track, a plurality of pickup heads adjacent said decoder disc sound track at sectors corresponding to said different sectors of said coder discs, a coincidence detector and means connecting each of said pickup heads to said coincidence detector, said coincidence detector providing a single pulse output only upon receiving simultaneously a predetermined number of tone bursts from said pickup heads.

7. The magentic disc coder-decoder of claim 6 and further comprising an indicator means and means connecting said coincidence detector thereto whereby an indication is provided by said single pulse output.

8. The magnetic disc coder-decoder of claim 6 further comprising a reject circuit, an additional pickup head adjacent said decoder disc sound track at a sector different from said sectors corresponding to said different sectors of said coder disc and means connecting said reject circuit to said additional pickup head and to the input of said coincidence detector whereby output from said additional pickup head prevents pulse output from said coincidence detector.

* * * * *